(12) United States Patent
Rácz et al.

(10) Patent No.: US 7,746,806 B2
(45) Date of Patent: Jun. 29, 2010

(54) DIMENSIONING METHODS FOR HSDPA TRAFFIC

(75) Inventors: Sándor Rácz, Cegléd (HU); Szilveszter Nádas, Budapest (HU); Szabolcs Malomsoky, Szentendre (HU); Balázs Peter Gerö, Budapest (HU); Ulf Rosberg, Tyresö (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 204 days.

(21) Appl. No.: 12/066,928

(22) PCT Filed: Sep. 11, 2006

(86) PCT No.: PCT/SE2006/050320

§ 371 (c)(1),
(2), (4) Date: Mar. 14, 2008

(87) PCT Pub. No.: WO2007/032733

PCT Pub. Date: Mar. 22, 2007

(65) Prior Publication Data

US 2008/0259812 A1 Oct. 23, 2008

Related U.S. Application Data

(60) Provisional application No. 60/717,978, filed on Sep. 16, 2005.

(51) Int. Cl.
*H04J 1/16* (2006.01)
*H04J 3/16* (2006.01)

(52) U.S. Cl. .................................. 370/252; 370/465

(58) Field of Classification Search ................ 370/252, 370/465
See application file for complete search history.

(56) References Cited

U.S. PATENT DOCUMENTS

| | | | |
|---|---|---|---|
| 7,050,407 B1 * | 5/2006 | Frazer et al. ................. | 370/329 |
| 7,400,889 B2 * | 7/2008 | Balasubramanian et al. ..... | 455/452.2 |
| 7,477,658 B2 * | 1/2009 | Gu .............................. | 370/468 |
| 7,492,752 B2 * | 2/2009 | Harris et al. .................. | 370/342 |
| 7,539,497 B2 * | 5/2009 | Beale .......................... | 455/451 |
| 2005/0220040 A1 * | 10/2005 | Petrovic et al. .............. | 370/278 |
| 2006/0039330 A1 * | 2/2006 | Hackett et al. ............... | 370/335 |
| 2008/0212468 A1 * | 9/2008 | Wigard et al. ................ | 370/230 |
| 2009/0141631 A1 * | 6/2009 | Kim et al. .................... | 370/235 |

* cited by examiner

*Primary Examiner*—Andrew Lee
(74) *Attorney, Agent, or Firm*—Roger S. Burleigh

(57) ABSTRACT

A method for determining the capacity that is needed on an Iub link to fulfill Grade of Service (GoS) requirements in a Universal Mobile Telecommunications System (UMTS) Terrestrial Radio Access Network (UTRAN) for both Dedicated Channel (DCH) traffic and High-Speed Downlink Packet Access (HSDPA) traffic. The method includes determining the bandwidth demand of the HSDPA traffic (ElasticDim); calculating an average bandwidth of the DCH traffic on the Iub interface (BWuse,avg); setting an initial capacity (Capacity) to the capacity need of the DCH traffic (Capacity DCH), wherein at least the initial capacity will be provided for the DCH traffic in the dimensioned system; and, increasing the value of Capacity until a quality requirement of the HSDPA traffic is fulfilled, the maximum value of Capacity reached being the capacity that is needed for DCH and HSDPA traffic for the Iub interface.

18 Claims, 5 Drawing Sheets

DIMENSIONING METHODS FOR HSDPA TRAFFIC

This application claims the benefit of U.S. Provisional Application No. 60/717,978, filed Sep. 16, 2005, the disclosure of which is fully incorporated herein by reference.

TECHNICAL FIELD OF THE INVENTION

The invention is related, in general, to the field of communications and, in particular, to improved dimensioning methods for High-Speed Downlink Packet Access (HSDPA) traffic.

BACKGROUND OF THE INVENTION

In the Universal Mobile Telecommunications System (UMTS) Terrestrial Radio Access Network (UTRAN), Dedicated Channel (DCH) traffic (i.e., user traffic) is given priority over High-Speed Downlink Packet Access (HSDPA) traffic on the Iub interface between the Radio Network Controller (RNC) and the Node B. In other words, HSDPA traffic only uses Iub interface capacity that is not used by DCH traffic. Typical dimensioning methods for the Iub interface, however, can cause HSDPA traffic flows to fail to meet desired Grade of Service (GoS) requirements.

Accordingly, there is a need in the art for improved dimensioning methods for HSDPA traffic. In particular, there is a need for an improved dimensioning method that determines the capacity that is needed for both DCH and HSDPA traffic to fulfill Grade of Service (GoS) requirements on an Iub link.

SUMMARY OF THE INVENTION

To overcome the deficiencies of the prior art, the present invention discloses methods for determining the capacity that is needed on an Iub link to fulfill Grade of Service (GoS) requirements in a Universal Mobile Telecommunications System (UMTS) Terrestrial Radio Access Network (UTRAN) for both Dedicated Channel (DCH) traffic and High-Speed Downlink Packet Access (HSDPA) traffic, the method comprising the steps of determining the bandwidth demand of the HSDPA traffic (ElasticDim); calculating an average bandwidth of the DCH traffic on the Iub interface ($\underline{BW}_{use,avg}$) setting an initial capacity (Capacity) to the capacity need of the DCH traffic (CapacityDCH), wherein at least the initial capacity will be provided for the DCH traffic in the dimensioned system; and, increasing the value of Capacity until a quality requirement of the HSDPA traffic is fulfilled, the maximum value of Capacity reached being the capacity that is needed for DCH and HSDPA traffic for the Iub interface.

In an exemplary method described more fully hereinafter, the step of determining the bandwidth demand of the HSDPA traffic (ElasticDim) comprises using an external tool to determine the bandwidth demand. Alternatively, the demand is determined based on an elastic user model, wherein the bandwidth need of HSDPA traffic is determined to provide a required target average (TargetAvg) download rate. According to an exemplary elastic user model, ElasticDim=MAX (AvgLoad+TargetAvg; TargetPeak), where AvgLoad is the average busy hour load, TargetAvg is the average user data download rate experienced during busy hour load conditions, and TargetPeak equals the target peak download rate for a single active HSDPA user. Using this model, the available bandwidth on the Iub interface is shared among the ongoing flows near equally and the length (i.e., download time) of a HSDPA flow depends on its received bit rate. If ElasticDim is less than a target peak rate (TargetPeak), then the value of ElasticDim is set to TargetPeak.

In an exemplary method, $\underline{BW}_{use,avg}$ is the average bandwidth use of different Radio Bearer (RB) types on the Iub interface. $\underline{BW}_{use,avg}$ is a vector, wherein the i-th element contains the average bandwidth use of an i-th RB type; $BW_{use,avg}(i)$=fEfficiency(i)×Activity(i)×PacketSize(i)/TTI (i), where fEfficiency is an efficiency factor, Activity is an activity factor that describes the fraction of time the connection is active, PacketSize is the Iub packet size, and TTI is the transmission time interval.

In the exemplary method described hereinafter, the step of increasing the value of Capacity until a quality requirement of the HSDPA traffic is fulfilled includes the steps of determining what fraction of time (actualGoS$_{HSDPA}$) the bandwidth demand of the HSDPA traffic (ElasticDim) is not available and, if actualGoS$_{HSDP}$ is larger than a target value (targetGoS), increasing Capacity by one predetermined bandwidth unit. The step of determining what fraction of time (actualGoS$_{HSDPA}$) the bandwidth demand of the HSDPA traffic (ElasticDim) is not available includes the step of using an external tool to determine actualGoS$_{HSDPA}$; alternatively, this determination can be based on a multi-rate loss model. In the exemplary embodiment described herein, such multi-rate loss model is based on the Kaufman-Roberts algorithm.

BRIEF DESCRIPTION OF THE FIGURES

To illustrate the features and functions of the invention, reference is now made to the following detailed description taken in conjunction with the accompanying drawings, in which.

DETAILED DESCRIPTION

The dimensioning method starts from the description of traffic demands and the required Grade of Service (GoS). The classes of different Dedicated Channels (DCHs) are described by the bandwidth demand on the Iub interface (BW), the offered load (offeredLoad) in Erlang (E), and the target blocking probability (GoS). The High-Speed Downlink Packet Access (HSDPA) traffic is described by the average traffic (AvgLoad), the peak user data throughput for single active HSDPA user (TargetPeak), and the target average download rate (TargetAvg). The output of the method is the required minimum link capacity. Using this capacity, both the GoS requirement of DCH traffic and the GoS requirement of HSDPA traffic (i.e., target average download rate) can be fulfilled.

Figure 1:
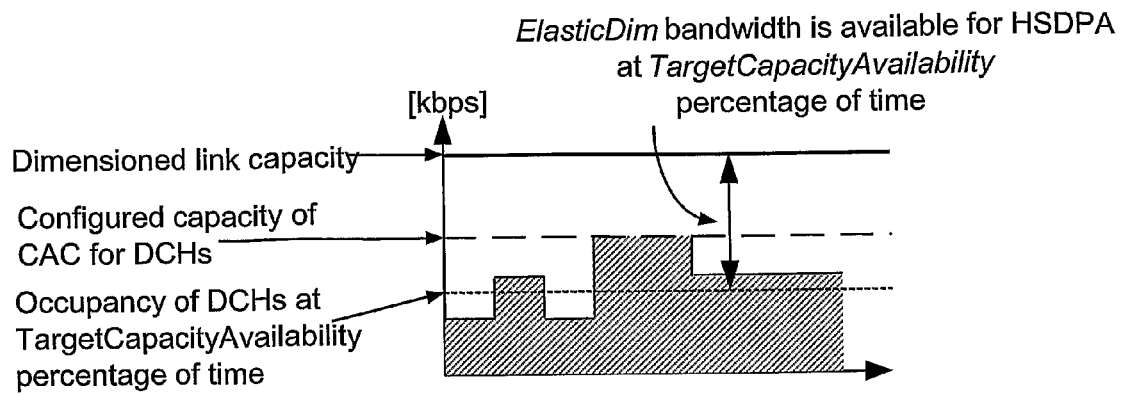
FIG. 1 illustrates the dimensioning of DCH and HSDPA traffic in a resource sharing environment.

The DCH traffic has priority over HSDPA traffic and the HSDPA traffic can use the capacity that is not used by DCH traffic. This resource sharing method allows a reduction in the required link capacity compared to the separate dimensioning of DCH and HSDPA traffic, as illustrated in FIG. 1.

There are two ways to get the bandwidth demand of HSDPA traffic denoted by ElasticDim. First, the bandwidth demand of HSDPA traffic can be determined by an external method/tool. Practically, the bandwidth demand of HSDPA traffic is an input parameter of the proposed method. Using this case a designer can take into account the resource sharing method on Uu interface more precisely. Probably, Round Robin (RR), Maximum Carrier-to-Interference (max C/I) ratio, or Proportional fair (PF) scheduling algorithm results in different achievable bandwidth for HSDPA traffic; therefore, the bandwidth demand of HSDPA traffic on Iub interface is also different. Second, an elastic model method can be used for HSDPA traffic dimensioning.

HSDPA traffic can be modeled as elastic traffic, wherein the available bandwidth is shared among ongoing flows near equally and the length (i.e., download time) of a HSDPA flow depends on its received bit rate. The bandwidth need of HSDPA traffic is determined to provide the required TargetAvg. If this bandwidth need, denoted by ElasticDim, is smaller than TargetPeak, then ElasticDim is set equal to TargetPeak.

ElasticDim can be calculated as follows:

$$ElasticDim=MAX(AvgLoad+TargetAvg; TargetPeak)$$

To fulfill the GoS requirement, regarding the "target average download rate," TargetAvg extra capacity is added to the average load of the HSDPA traffic; i.e., the TaregtAvg amount of additional capacity is needed over the AvgLoad to fulfill the GoS requirement of the "target average download rate."

The capacity that is required to fulfill the GoS requirement of DCHs and to assure the bandwidth need of HSDPA (ElasticDim) with high probability (e.g., TargetCapacityAvailability is 90%) is determined. In this step, a dimensioning method based on the Kaufman-Roberts (KR) formula can be used.

For HSDPA, the "1-TargetCapacityAvailability" as blocking probability target and ElasticDim as its bandwidth need can be used. This HSDPA class has low priority and in this way does not have effect on DCHs; therefore, the offered load of this class can be set to zero.

The bandwidth demand of the DCH classes is set to the average bandwidth use of the DCH classes instead of setting it to the bandwidth reserved by the Connection Admission Control (CAC) for DCH classes. If the capacity need of DCHs with the bandwidth need reserved by the CAC (which is larger than the bandwidths used during the joint dimensioning of DCHs and HSDPA) is higher than the capacity calculated in this second step, then the larger capacity need should be used. To provide the packet level GoS, like strict delay bounds, it is necessary to give more bandwidth for a DCH connection than its average bandwidth. However, the DCH connections occupy only their average bandwidth on a longer time-scale and in this way the unused bandwidth can be utilized by HSDPA connections. The offered load of DCHs are input parameters of the dimensioning.

Finally, using the settings described above, the Kaufman-Roberts dimensioning formula provides the required capacity for DCHs and HSDPA traffic, assuming resource sharing between them. If the capacity need of DCHs with the bandwidth need reserved by the CAC (which is larger than the average bandwidth used during the joint dimensioning of DCHs and HSDPA) is higher, then the larger capacity is used for the required capacity. The capacity need of DCHs with the bandwidth need reserved by the CAC is an input parameter of the dimensioning.

Before describing an exemplary method in accordance with the principles of the invention, the advantages of the resource-sharing method and then how the dimensioning method can take into account these advantages are explained.

The resource-sharing scenario has the following attributes: class A/B and class C traffic is on the same Constant Bit Rate (CBR) Virtual Channel (VC), wherein class A/B has priority over class C; and resources not used by class A/B can be used by class C. The DCH connections are mapped into class A/B and HSDPA connections are mapped into Class C. The dimensioning procedure takes into account these attributes in several ways.

Figure 2:
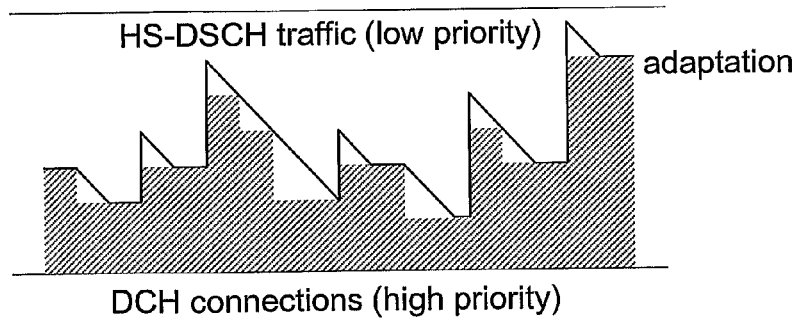
FIG. 2 illustrates how Class C traffic adapts to varying available bandwidth.

First, the class A/B traffic typically does not load to peak and the resources allocated for class A/B vary in time. Class C can use the resources not used by class A/B, but the speed of the adaptation of class C resource allocation is limited by the dynamics of the protocols that control the amount of HSDPA traffic (such as Transmission Control Protocol (TCP) and the flow control between the RNC and the Node B). FIG. 2 shows an example of how class C traffic adapts to the varying available bandwidth (Effect "A"). When the capacity available for class C traffic increases, the adaptation slowly explores the additionally available bandwidth. When the capacity available for class C traffic decreases, then after detecting the congestion the adaptation cuts the rate of the flows fast then slowly explores the available capacity. This adaptation takes time in both cases, which results in not all the capacity remaining from class A/B traffic being used by low priority traffic.

Figure 3:
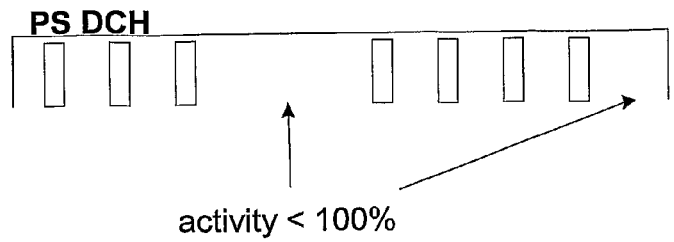
FIG. 3 illustrates how the average utilization of PS DCHs are less than 100%.

Second, the Packet Switched Dedicated Channels (PS DCHs) are usually not fully utilized, as illustrated in FIG. 3 (Effect "B"), but in the CAC for class A/B the activity factor for these connections is still set to 1 (i.e., it is a conservative assumption). The dimensioning procedure disclosed herein assumes that the utilization of PS DCHs is less than 100%.

Third, to fulfill the strict delay requirements of class A/B connections, the resources reserved for a DCH by the CAC may well be above the DCH rate (e.g., 64 k or 384 k). For example, the bandwidth reserved by the CAC for a 384 k bearer increases as the delay requirement, $\tilde{D}$, of packets between the RNC and Node-B is decreased. If the capacity of the shared VC is small, the statistical multiplexing cannot be effective because only a few (e.g., 1 or 2) 384 k connections can be multiplexed on the link. In such cases, the dimensioning procedure takes into account that the DCH rate can be smaller than the bandwidth allocated for it by the CAC. This difference between the DCH rate and the allocated bandwidth can be large only for "small systems," where the maximum number of connections of a certain DCH type that can be accepted is small and the delay requirement is strict.

Figure 4:
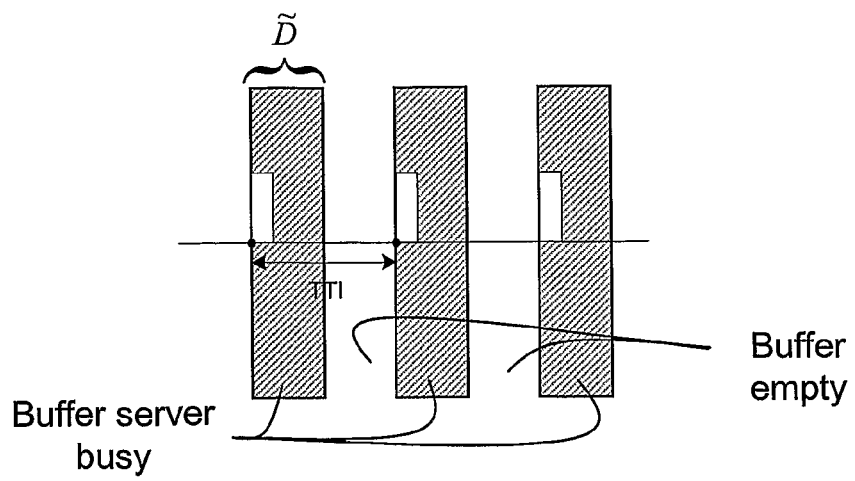
FIG. 4 illustrates the effects of a delay requirement on buffer utilization.

For example, consider a system where having only two priority queues on Asynchronous Transfer Mode (ATM) Adaptation Layer Type 2 (AAL2) level. In this case, class A/B shares the high priority AAL2 queue in a First In First Out (FIFO) manner and, thus, the most stringent delay requirement has to be fulfilled for all class A/B connections (i.e., the delay requirement of voice). Assume that the VC capacity is so small that there can be at most one 384 k PS connection in the system. FIG. 4 shows that since the delay requirement, $\tilde{D}$, is smaller than the Transmission Time Interval (TTI), the buffer server is busy only a fraction of the time (Effect "C"). Thus, the AAL2 class C traffic can use remaining capacity when the class A/B buffer is empty.

Figure 5:
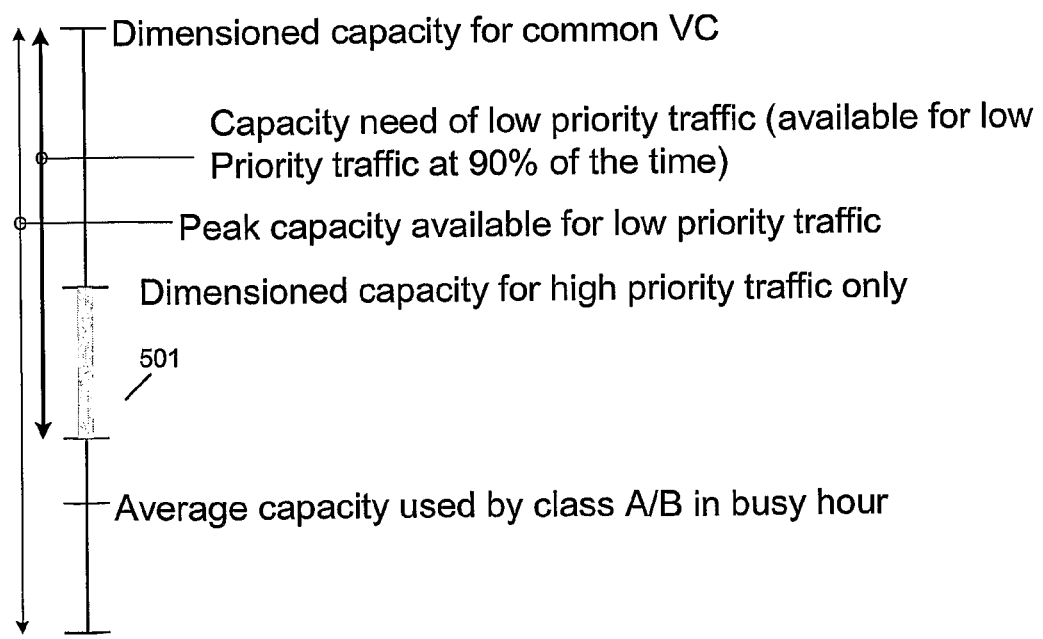
FIG. 5 illustrates dimensioning in a resource sharing scenario.

All the aforementioned effects are considered using the dimensioning method according to the principles of the invention. The dimensioning is done using the Kaufmann-Roberts dimensioning method. The low priority traffic demand is included in the dimensioning as a new traffic class. The bandwidth demand of this traffic class equals to the dimensioned capacity need of low priority traffic as illustrated in FIG. 5; the portion 501 represents the bandwidth gain because of resource sharing.

Effect "A" is addressed, for example, by using a 10% GoS target value for the newly added traffic class representing the low priority traffic demand. This means that the capacity needed for low priority traffic will be available 90% of the time. (In case of ideal adaptation to the varying bandwidth, the average bandwidth use of the high priority sources could be used. The use of 90% is an educated guess for including the effect of non-ideal adaptation.) Effect "B" is addressed by applying a PS efficiency factor (fEfficiency) to the bandwidth need of PS traffic classes when dimensioning the common VC. Effect "C" is addressed using the average load of a connection of a traffic class (packet_size*activity/TTI) as an input to the Kaufman-Roberts dimensioning method instead of the bandwidth calculated by the CAC (which can be as high as packet_size*activity/D in an extreme case). FIG. 5 depicts the different dimensioned capacities.

Figure 6A:
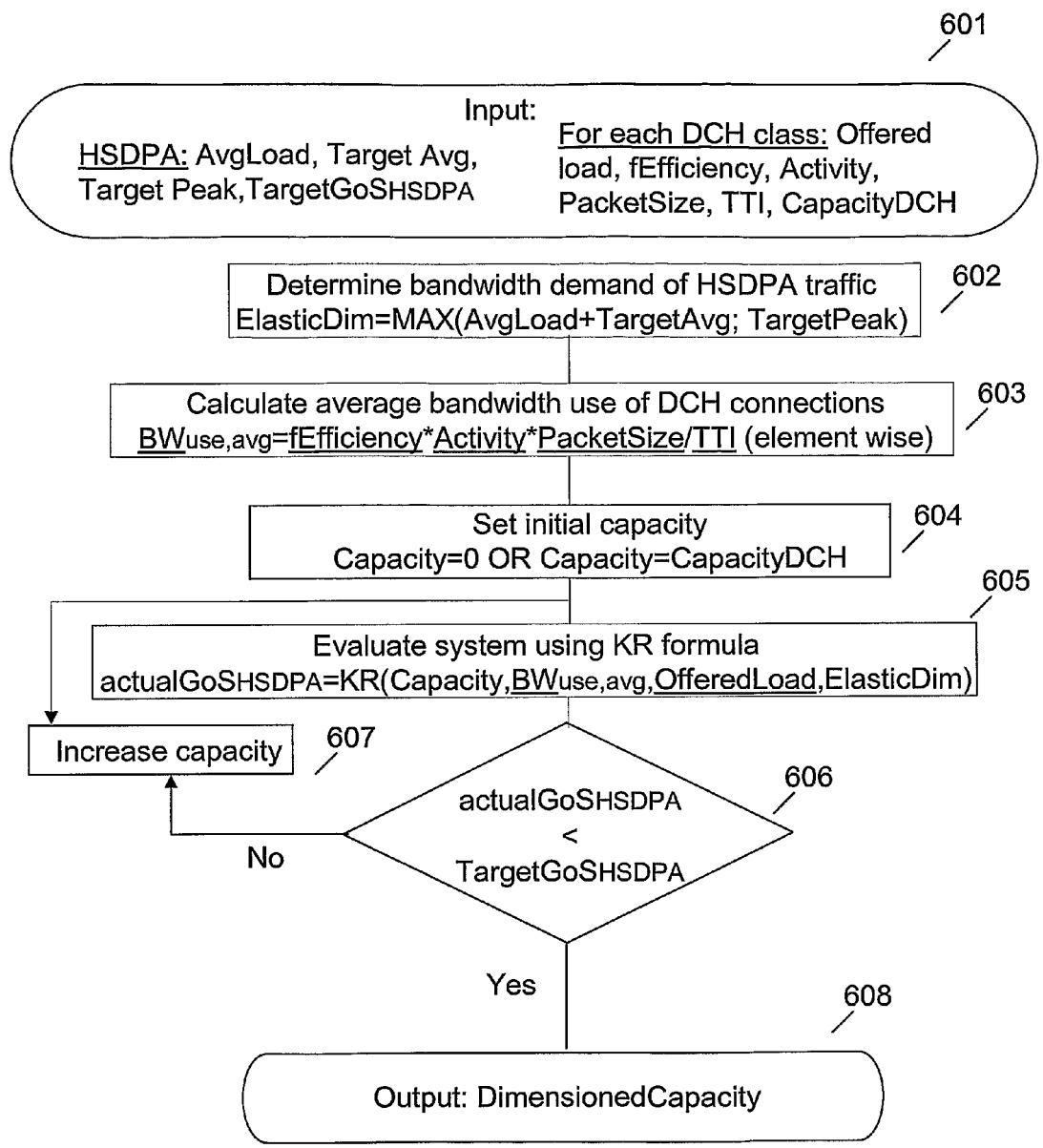
FIG. 6A illustrates an exemplary dimensioning method in accordance with the principles of the invention.
Figure 6B:
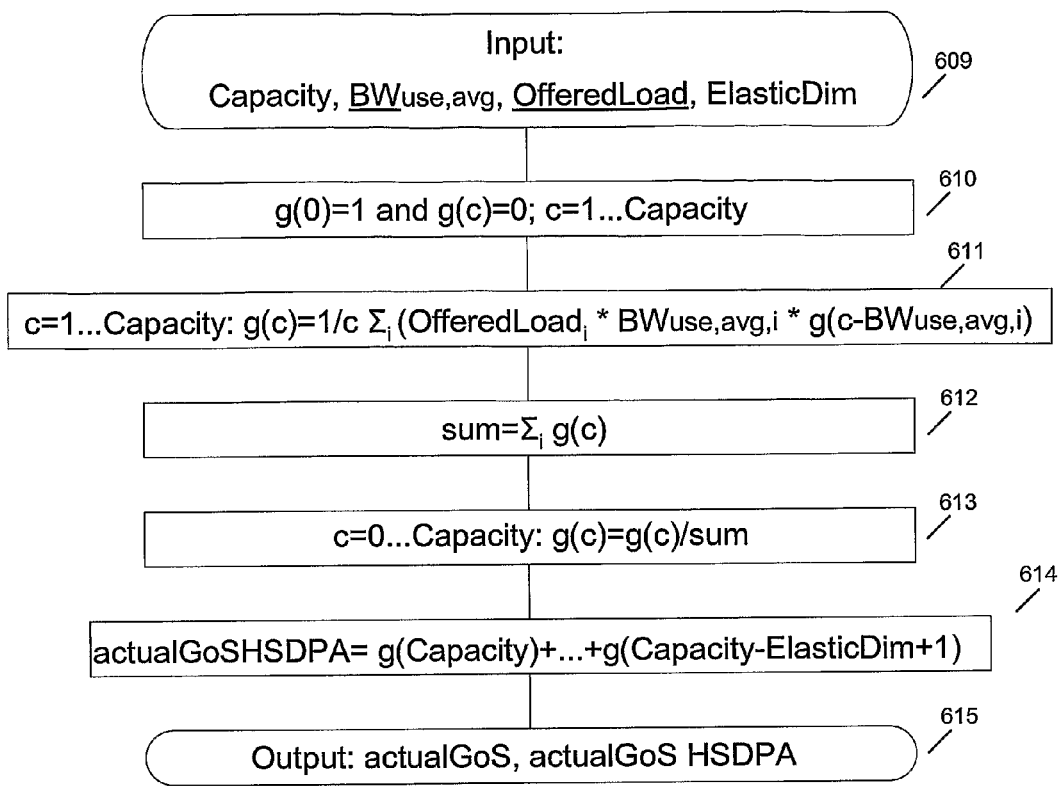
FIG. 6B illustrates the method according to the Kaufman-Roberts algorithm utilized in the exemplary dimensioning method illustrated in FIG. 6A.

Turning now to FIGS. 6A and 6B, illustrated is an exemplary dimensioning method in accordance with the principles of the invention (FIG. 6A), including a method according to the Kaufmann-Roberts algorithm (FIG. 6B) utilized in the exemplary dimensioning method. In utilizing the method, all bandwidths should be transformed to a common bandwidth unit (e.g., 1 kbps); all bandwidths expressed in bandwidth units are integer numbers.

The dimensioning starts with the collection of required input parameters. The input of the method can be divided into two parts: (i) DCH related, and (ii) HSDPA related. In the system under dimensioning, several different DCH traffic classes are supported. Each DCH traffic has the following description:

The offered load of the traffic class in Erlang is denoted by offeredLoad. The offeredLoad is a vector and its i-th element contains the offered load of the i-th DCH traffic class. This offered load includes the load increase due to soft-handover. The offered load is the arrival intensity of connections (average number of arrived new connection during a second) multiplied by the mean holding time (i.e., mean duration) of a connection.

Description of the Radio Bearer(s) (RB) of each DCH class; i.e., packet size is bit, TTI, activity factor; and efficiency factor for PS RB.

The minimal capacity need of DCH traffic (capacityDCH) is also an input parameter for dimensioning method. The DCH traffic has strict delay and loss requirements on the Iub interface; therefore, an external tool is required to determine the capacity that is needed to fulfill the quality requirement of DCHs. This capacity is needed for only DCH traffic. Trivially, the capacity need of DCH and HSDPA traffic must be at least this capacity.

The HSDPA related inputs are the following:

Average busy hour traffic in kbps, denoted by AvgLoad. This average busy hour traffic is the average amount of data carried over an HSDPA connection during the busy hour divided by the length of the busy hour (i.e., 3600 seconds). Alternatively, this can be calculated by multiplying the number of users by the average load of a user in the busy hour.

Target average download rate, denoted by TargetAvg. This is the average user data download rate within a session that in average shall be experienced by an HSDPA user during busy hour traffic load conditions. The experienced rate will vary statistically between sessions with the variance decreasing for increasing session lengths.

Target peak rate in kbps, denoted by TargetPeak. If there is only one active HSDPA user in the Radio Base Station (RBS; i.e., a Node-B), then the user should be able to download long user data files at this rate, unless restricted by other factors (for example poor radio conditions or low UE capability) than the dimensioned Transport Network (TN) capacity for Iub to the RBS.

Target GoS for HSDPA, denoted by targetGoS. If target GoS for HSDPA is 10%, then it means that the capacity needed for HSDPA traffic will be available 90% of the time.

After collecting all input (Step 601), the required capacity for DCH and HSDPA traffic can be determined. In Step 602, the capacity need of HSDPA traffic (ElasticDim) is determined. This capacity would be needed when a dedicated fixed capacity resource is used on the Iub for HSDPA traffic. In this step, there are two options: (i) use an external tool to determine ElasticDim, or (ii) determine ElasticDim based on elastic user model. In the first case, the bandwidth demand of HSDPA traffic is an input parameter of the method; in this case, the designer can take into account the resource sharing method on Uu interface more precisely. Probably, RR, Maximum Carrier-to-Interference (max C/I) ratio, or PF scheduling algorithm results in different achievable bandwidth for HSDPA traffic; therefore, the bandwidth demand of HSDPA traffic on Iub interface is also different. In the second case, the elastic model method can be used for HSDPA traffic dimensioning. In the elastic model, it is assumed that the HSDPA traffic can be modeled as elastic traffic. This means that the available bandwidth on Iub interface is shared among the ongoing flows near equally and the length (i.e., download time) of a HSDPA flow depends on its receive rate. The bandwidth need of HSDPA traffic is determined to provide the required TargetAvg. If this bandwidth need (ElasticDim) is smaller than TargetPeak, then the value of ElasticDim is set to TargetPeak. Step 602, therefore, based on the elastic user model, and consideration of "Peak user data throughput for single active HSDPA user," will then result in the following necessary link capacity:

$$\text{ElasticDim}=\text{MAX}(\text{AvgLoad}+\text{TargetAvg};\text{TargetPeak})$$

In other words, to fulfill the GoS requirement regarding the "target average download rate" (TargetAvg), the TargetAvg extra capacity is added to the average load of the HSDPA traffic (AvgLoad). In other words, the TaregtAvg amount of additional capacity is needed over the AvgLoad to fulfill the GoS requirement of the "target average download rate" (TargetAvg). This ElasticDim can be increased with a factor (e.g., multiply by a number greater than 1) that describes the transport efficiency of the system. The protocols overhead also can be taken into account in this factor. At the end of step 602, ElasticDim has been determined.

Next, in Step 603, the average bandwidth use of different Radio Bearers (RBs) on the Iub interface is determined. Because the system supports more than one RB type, the bandwidth use of all possible RB types is determined. This average bandwidth is denoted by $\underline{BW}_{use,avg}$, where $\underline{BW}_{use,avg}$ is a vector and its i-th element contains the average bandwidth use of the i-th RB type.

The average bandwidth use on an Iub interface of an A/B ALL2 class connection that carries the packets of the RBs of DCHs is the packet size divided by the TTI; i.e., the inter arrival time of packets when the connection is active (there is data to send). To take into account the activity of the connection (i.e., there are time intervals when there is no data to send), it is multiplied with an activity factor (Activity). The activity factor (<=1) describes how active the connection is (i.e., which fraction of time the connection is active). Considering effect "B," it is multiplied with an efficiency factor (fEfficiency). Each RB type has its own activity and efficiency factors. The TTIs and the packet sizes (PacketSize) are system specific values. The activity and efficiency factors are traffic and system related and can be determined by measurement or based on some analytical method or other external tool. At the end of step 602, the vector $\underline{BW}_{use,avg}$ of that i-th element contains the average bandwidth use of the i-th RB type has been determined.

Next, in Step 604, the capacity (Capacity) is set to the capacity need of DCHs (capacityDCH), because at least this capacity will be put for the DCHs in the dimensioned system. Subsequently, the method will increase the capacity until the quality requirement of HSDPA traffic is fulfilled.

In Step 605, the capacity is increased until the quality requirement of HSDPA traffic is fulfilled. In the loop (Steps 605, 606, 607), the system is evaluated for the actual capacity; i.e. determine during what fraction of time the ElasticDim is not available for the HSDPA traffic. If this fraction of time, denoted by actualGoS$_{HSDP}$, is larger than the required value targetGoS, the capacity is increased by one bandwidth unit. To determine during what fraction of time the ElasticDim is not available for the HSDPA traffic (i.e., actualGoS$_{HSDP}$), there are two options: (i) use an external tool to determine actualGoS$_{HSDP}$, or (ii) determine actualGoS$_{HSDP}$ based on multi-rate loss model (see FIG. 6B and description relating thereto). At the end of this step, Capacity will contain the dimensioned capacity that is needed for DCH and HSDPA traffic.

The method to determine actualGoS$_{HSDP}$ based on multi-rate loss model is based on the Kaufman-Roberts algorithm as known to those of skill in the art. Referring to FIG. 6B, the method starts with the collection of required input parameters (Step 609). The input parameters are: Capacity, the vector $\underline{BW}_{use,avg}$, the vector offeredLoad, and ElasticDim, which were described hereinabove. Next, in step 610, a vector g is initialized; the vector g contains the link occupancy distribution at the end of the method. The first element is set to 1 and the remaining elements are set to zero. During this method, the value of g is not required to be normalized to 1.

In step 611, the elements of vector g from c=1 to Capacity are calculated step-by-step. The c-th element of the vector g is calculated as follows: multiply the vector $\underline{BW}_{use,avg}$ with the vector offeredLoad element-wise to obtain a new vector denoted by $\underline{V}$ and $V(i)=BW_{use,avg}(i) \times \text{offeredLoad}(i)$. Then, $V(i)$ is multiplied by the $g(c-BW_{use,avg}(i))$ if $c-BW_{use,avg}(i) > 0$, otherwise multiply with zero. Then, sum up $V(i)$ over i and divide by c.

In step 612, the sum of the vector g is determined. This sum will be used in the normalization of the occupancy distribution to 1.

Next, in step 613, the occupancy distribution is normalized; i.e., g(c) is divided by the sum for all c=1 to capacity.

In step 614, actualGoS$_{HSDP}$ is determined; this is the HSDPA traffic that is the sum of occupancy distribution (i.e., the vector g) from Capacity-ElasticDim-1 to Capacity. This actualGoS$_{HSDP}$ is the probability of the event the capacity left by DCH is less than the ElasticDim capacity. This value of actualGoS$_{HSDP}$ is output in step 615.

Figure 7:
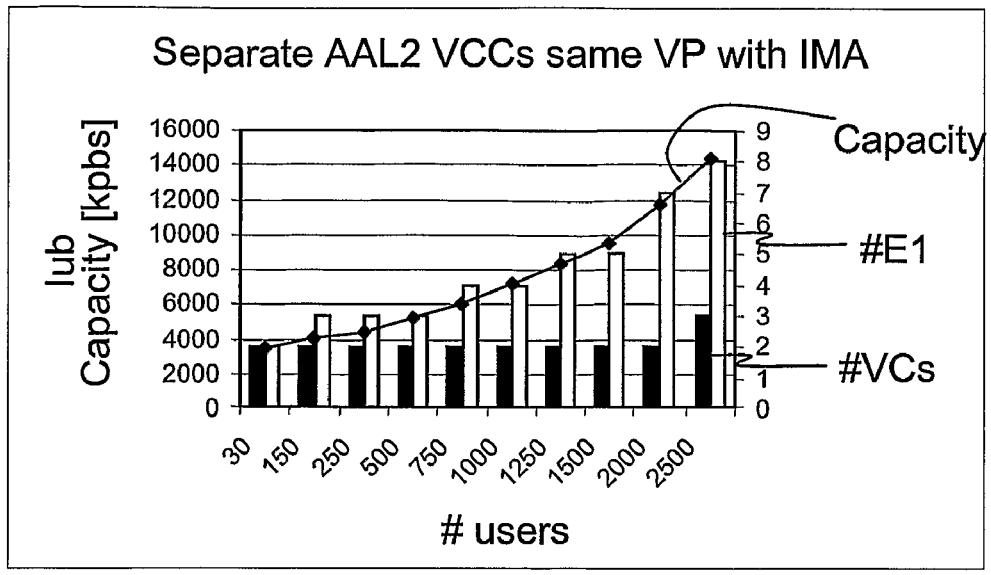
FIG. 7 illustrates the resource needs of DCH and HSDPA traffic using separate AAL2 VCC for DCH and HSDPA traffic; and, FIG. 8 illustrates the resource need of DCH and HSDPA traffic using resource sharing according to the principles of the invention.
Figure 8:
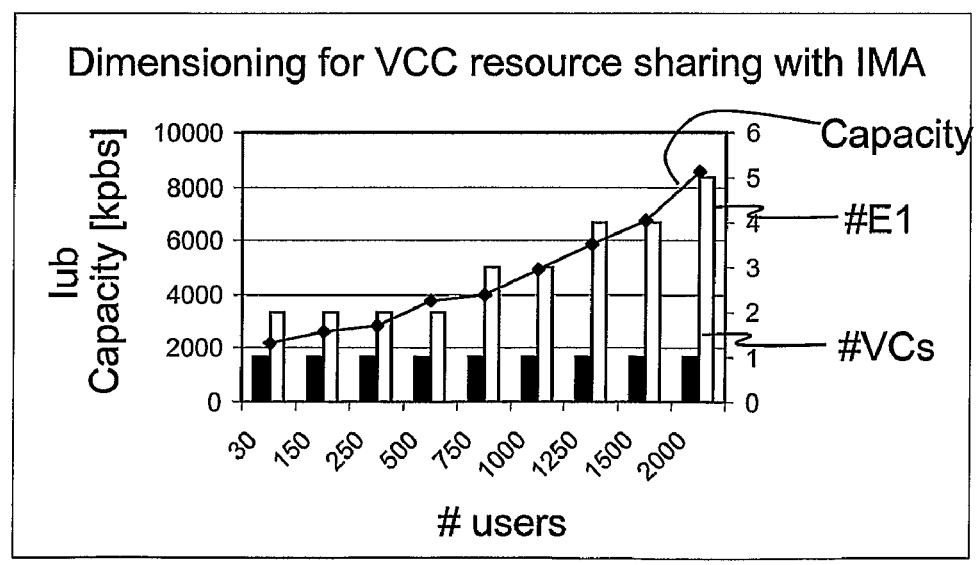

From the foregoing, those skilled in the art will recognize that, in most cases, the application of resource sharing results in significant capacity gain over the separate handling of DCH and HSDPA traffic. FIGS. 7 and 8 show that using resource sharing can save a significant amount of capacity. The two examples illustrated have equal traffic load or traffic pattern/model. In these examples, an European digital transmission format 1 (E1) physical layer transmission interface was considered, which is commonly used in Europe and provides 1920 kbps for ATM cells. This means that the Iub link capacity has this E1 granularity. The Inverse Multiplexing for ATM (IMA) feature is used to group E1s to achieve higher ATM Virtual Path Connection (VPC) bandwidth than 1920 kbps. Those skilled in the art will recognize that resource sharing according to the principles disclosed herein results in the reduction in the required E1 capacity. For example, considering the case of 2000 users, separate AAL2 Virtual Channel Connections (VCCs) requires seven E1 capacity, but using resource sharing requires only five E1 capacity.

The foregoing has outlined, rather broadly, the principles of the present invention so that those skilled in the art may better understand the detailed description of the exemplary embodiments that follow. Those skilled in the art should appreciate that they can readily use the disclosed conception and exemplary embodiments as a basis for designing or modifying other structures and methods for carrying out the same purposes of the present invention. Those skilled in the art should also realize that such equivalent constructions do not depart from the spirit and scope of the invention in its broadest form, as defined by the claims provided hereinafter.

We claim:

1. A method for determining the capacity that is needed on an Iub link to fulfill Grade of Service (GoS) requirements in a Universal Mobile Telecommunications System (UMTS) Terrestrial Radio Access Network (UTRAN) for both Dedicated Channel (DCH) traffic and High-Speed Downlink Packet Access (HSDPA) traffic, wherein said Iub link comprises a link between a Radio Network Controller (RNC) and a Node-B, said method comprising the steps of:
   determining the bandwidth demand of said HSDPA traffic (ElasticDim);
   calculating an average bandwidth of said DCH traffic on said Iub interface ($BW_{use,avg}$);
   setting an initial capacity (Capacity) to the capacity need of said DCH traffic (Capacity DCH), wherein at least said initial capacity will be provided for said DCH traffic in the dimensioned system; and,
   increasing the value of Capacity until a quality requirement of said HSDPA traffic is fulfilled, the maximum value of Capacity reached being the capacity that is needed for DCH and HSDPA traffic for said Iub interface.

2. The method recited in claim 1, wherein said step of determining the bandwidth demand of said HSDPA traffic comprises using an external tool to determine said bandwidth demand.

3. The method recited in claim 1, wherein said step of determining the bandwidth demand of said HSDPA traffic comprises determining said demand based on an elastic user model.

4. The method recited in claim 3, wherein the available bandwidth on said Iub interface is shared among the ongoing flows near equally and the duration of a HSDPA flow depends on its received bit rate.

5. The method recited in claim 3, comprising the step of determining the bandwidth need of HSDPA traffic to provide a required predetermined target average (TargetAvg) download rate.

6. The method recited in claim 5, wherein if ElasticDim is less than a predetermined target peak rate (TargetPeak), then setting the value of ElasticDim to TargetPeak.

7. The method recited in claim 1, wherein ElasticDim=MAX(AvgLoad+TargetAvg; TargetPeak), where AvgLoad is a predetermined average busy hour load, TargetAvg is a predetermined average user data download rate experienced during busy hour load conditions, and TargetPeak equals a predetermined target peak download rate for a single active HSDPA user.

8. The method recited in claim 1, wherein $\underline{BW_{use,avg}}$ is the average bandwidth use of different Radio Bearer (RB) types on the Iub interface.

9. The method recited in claim 8, wherein $\underline{BW_{use,avg}}$ is a vector, wherein the i-th element, $BW_{use|avg}(i)$, contains the average bandwidth use of an i-th RB type.

10. The method recited in claim 9, wherein $BW_{use:avg}(i)$ =fEfficiency(i)×Activity(i)×PacketSize(i)/TTI(i), where fEfficiency is a predetermined efficiency factor, Activity is a predetermined activity factor that describes the fraction of time the connection is active, PacketSize is a predetermined Iub packet size, and TTI a predetermined transmission time interval.

11. The method recited in claim 1, wherein said step of increasing the value of Capacity until a quality requirement of said HSDPA traffic is fulfilled comprises the steps of:

determining what fraction of time ($actualGoS_{HSDPA}$) the bandwidth demand of said HSDPA traffic (ElasticDim) is not available;

if $actualGoS_{HSDP}$, is larger than a predetermined target GoS value (targetGoS), increasing Capacity by one predetermined bandwidth unit.

12. The method recited in claim 11, wherein said step of determining what fraction of time ($actualGoS_{HSDPA}$) the bandwidth demand of said HSDPA traffic (ElasticDim) is not available comprises the step of using an external tool to determine $actualGoS_{HSDPA}$.

13. The method recited in claim 11, wherein said step of determining what fraction of time ($actualGoS_{HSDPA}$) the bandwidth demand of said HSDPA traffic (ElasticDim) is not available comprises the step of determining $actualGoS_{HSDP}$ based on multi-rate loss model.

14. The method recited in claim 13, wherein said multi-rate loss model is based on the Kaufman-Roberts (KR) algorithm.

15. The method recited in claim 14, where $actualGoS_{HSDP}$=KR(Capacity, $\underline{BW_{use,avg}}$, OfferedLoad, ElasticDim), wherein OfferedLoad is a predetermined vector and its i-th element contains the offered load of the i-th DCH traffic class.

16. The method recited in claim 5, wherein said predetermined target average (TargetAvg) download rate corresponds to a desired average user data download rate within a session that in average shall be experienced by an HSDPA user during busy hour traffic load conditions.

17. The method recited in claim 6, wherein said a predetermined target peak rate (TargetPeak) corresponds to a desired download rate a user should experience if there is only one active HSDPA user in the Node-B.

18. The method recited in claim 11, wherein said predetermined target GoS value (targetGoS) equals x %, wherein the capacity needed for HSDPA traffic will be available 100−x %.

* * * * *

UNITED STATES PATENT AND TRADEMARK OFFICE
CERTIFICATE OF CORRECTION

PATENT NO. : 7,746,806 B2  
APPLICATION NO. : 12/066928  
DATED : June 29, 2010  
INVENTOR(S) : Racz et al.

It is certified that error appears in the above-identified patent and that said Letters Patent is hereby corrected as shown below:

On the Title Page, Item (57) under "ABSTRACT", Line 9, delete "(BW use,avg);" and insert -- $(BW_{use,avg})$; --, therefor.

In Column 2, Line 17, delete "actualGoS$_{HSDP}$," and insert -- actualGoS$_{HSDPA}$, --, therefor.

In Column 8, Line 1, delete "g)" and insert -- g) --, therefor.

In Column 7, Line 32, delete "actualGoS$_{HSDP}$," and insert -- actualGoS$_{HSDPA}$, --, therefor.

In Column 7, Line 35, delete "actualGoS$_{HSDP}$)," and insert -- actualGoS$_{HSDPA}$), --, therefor.

In Column 7, Line 37, delete "actualGoS$_{HSDP}$, or (ii) determine actualGoS$_{HSDP}$" and insert -- actualGoS$_{HSDPA}$, or (ii) determine actualGoS$_{HSDPA}$ --, therefor.

In Column 7, Line 42, delete "actualGoS$_{HSDP}$" and insert -- actualGoS$_{HSDPA}$ --, therefor.

In Column 7, Line 66, delete "actualGoS$_{HSDP}$" and insert -- actualGoS$_{HSDPA}$ --, therefor.

In Column 8, Line 2, delete "'actualGoS$_{HSDP}$" and insert -- actualGoS$_{HSDPA}$ --, therefor.

In Column 8, Line 4, delete "actualGoS$_{HSDP}$" and insert -- actualGoS$_{HSDPA}$ -- , therefor.

In Column 8, Line 51, in Claim 1, delete "$(BW_{use.avg})$;" and insert -- $(BW_{use,avg})$; --, therefor.

In Column 9, Line 25, in Claim 9, delete "$BW_{use|avg}(i)$," and insert -- $BW_{use,avg}(i)$, --, therefor.

In Column 9, Line 27, in Claim 10, delete "$BW_{use:avg}(i)$" and insert -- $BW_{use,avg}(i)$ --, therefor.

In Column 9, Line 32, in Claim 10, after "TTI", insert -- is --.

Signed and Sealed this

Sixteenth Day of November, 2010

David J. Kappos  
*Director of the United States Patent and Trademark Office*

CERTIFICATE OF CORRECTION (continued)
U.S. Pat. No. 7,746,806 B2

In Column 10, Line 4, in Claim 11, delete "actualGoS$_{HSDP}$," and insert -- actualGoS$_{HSDPA}$, --, therefor.

In Column 10, Line 15, in Claim 13, delete "actualGoS$_{HSDP}$" and insert -- actualGoS$_{HSDPA}$ --, therefor.

In Column 10, Line 20, in Claim 15, delete "actualGoS$_{HSDP}$" and insert -- actualGoS$_{HSDPA}$ --, therefor.